Patented June 16, 1942

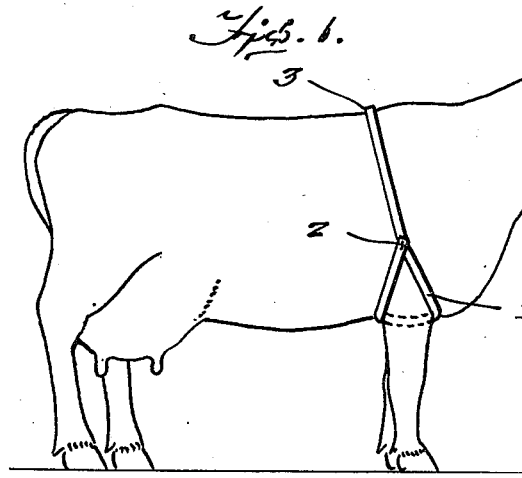
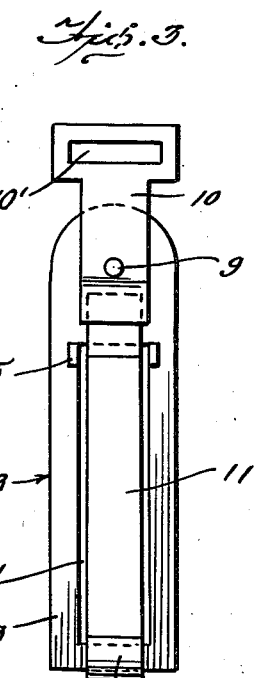
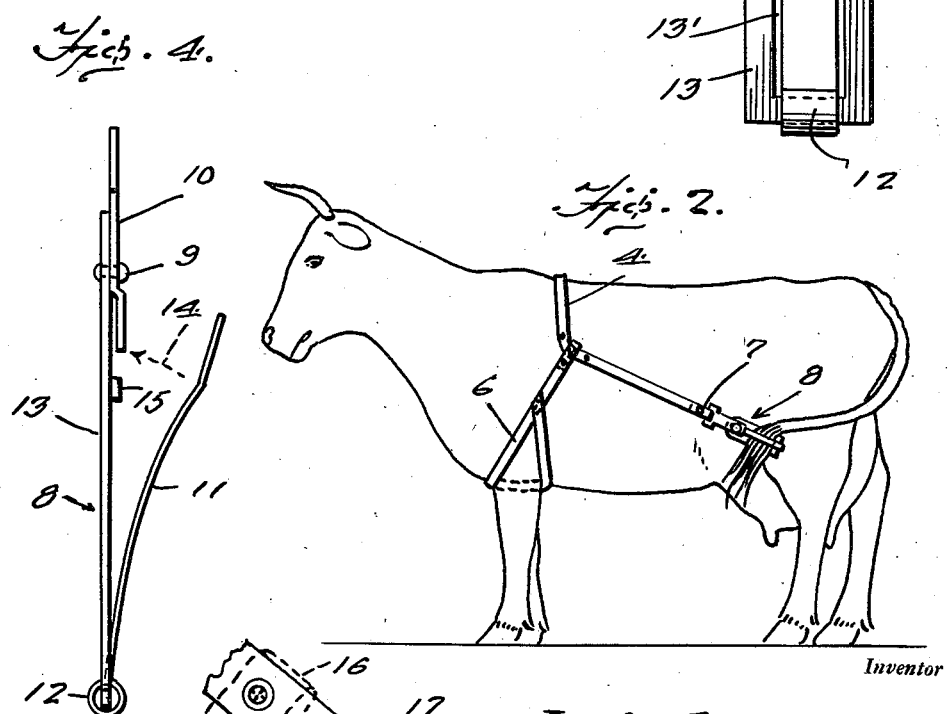

2,286,258

UNITED STATES PATENT OFFICE 2,286,258

SANITARY TAIL TIE

Louis Bubenic, Emery, Wis.

Application March 27, 1940, Serial No. 326,252

3 Claims. (Cl. 119—105)

The main object of my invention is to aid the dairyman in producing milk under more sanitary conditions by keeping the cows' tails clean and dry during the winter housing period.

A further feature of my sanitary tail tie is the fact that it is not necessary to remove this contrivance between milkings or at night or even when the cattle are let out for exercise. In view of this fact, the contrivance may be applied in the fall of the year and removed just before the fly season begins.

Another feature of my sanitary tail tie is that the cow cannot, during milking, switch and soil the clothes of the milker. The cow can not stir up dust or cause any foreign matter to be brushed into the milk pail with her tail.

Another feature of my invention is that it is unnecessary to handle or touch this device during milking time thus preventing the milker's hands from becoming soiled, which in turn helps produce cleaner milk.

A still further object of my invention is to allow absolute freedom and comfort to the animal while the sanitary tail tie is in use.

A still further object of my invention is to make such a contrivance safe by using snap fasteners so placed as to allow adjustments and also become a safety factor.

With the above and other objects in view, I here submit a drawing of my sanitary tail tie and an explanation thereof.

In the accompanying drawing wherein like reference characters indicate corresponding parts throughout all views:

Figure 1 of my drawing shows the right hand side of the animal. It shows the approximate position of the band of canvas webbing to be used as a harness.

Figure 2 of my drawing shows the left hand side of the animal and the approximate position of the webbing on the left side of the animal. Figure 2 also shows the clasp which attaches the harness to the animal's tail.

Figure 3 gives a front view of the clasp used to attach the animal's tail to the harness.

Figure 4 shows the same clasp mentioned above, but is a side or edge view of the same. The clasp in Figure 4 is opened in readiness to admit the animal's tail.

Figure 5 shows an enlarged view of a portion of the harness and the use of snap fasteners in making necessary adjustments.

Now having particular reference to the drawing, the sanitary tail tie consists of a harness of some suitable material, possibly canvas webbing, and a clasp consisting of two parts the spring and the base.

Number 1 shows a portion of the harness which passes under the animal's right front leg and is joined at 2. From the point indicated by 2 it passes over the animal's back at point indicated by 3.

Fig. 2 shows the left side of the cow. No. 4 shows a continuation of this band coming over animal's back as described in the above paragraph. At a point between 4 and 7 the webbing is connected to a loop of the same material by means of snap fasteners. 6 shows how the loop passes under animal's left front leg. No. 7 shows a continuation of the harness and how it is connected by snap fasteners to the tail clasp, No. 8.

Fig. 3, No. 9 is a spun rivet which is the pivot of the part No. 10, the latter having a slot 10' in its outer end to which the harness 7 is attached. Part 10 can be swung on said pivot 9 to allow the spring, No. 11, to be released from its position under 10.

No. 12 shows the swinging hinge joint between the spring 11 and the base of the clasp hereafter known as 13.

The dashed line, Fig. 4, No. 14 indicates that spring 11 can be swung away from the base of the clasp 13, leaving space for tail to be inserted between 13 and 11. The center portion of the clasp 13 is cut away to form an opening 13' to reduce its weight.

To assure the comprehension of how the clasp is attached, I here give instructions:

Swing 10 sidewise out of alinement with 13. Bend 11 over tail in space between 11 and 13 and insert 11 under 10. Return 10 to a straight position as shown in Fig. 3.

Projections 15 help keep 11 in alinement when the clasp is closed.

Figure 5 shows the use of snap fasteners for securing the end of the loop 6 to the band 4 to allow adjustment as indicated by the dotted line position 16 and full line position 17.

From the foregoing, it will be understood that my contrivance consists of two parts which are both of my own design. I have specified the most important part of my invention and I claim the right to modify my contrivance without departing from the general scope of my invention as described above.

What I claim as my invention is:

1. A cow's tail holder comprising a strap including a pair of loops adapted for engaging the respective front legs of the animal and a connecting portion extending across the back of the animal, a rearwardly extending strap having one end attached to said first named strap and a tail engaging clamp secured to the other end of said last named strap.

2. A cow's tail holder comprising a strap adapted for attaching to the cow, a tail clamping device including a rigid plate, a spring arm pivoted at one end to said plate and adapted to clamp the tail against the plate and a pivotal connector for the plate and engaging the free end of the arm to secure the arm in clamping position, said strap being attached to the connector and retaining the latter in engagement with the arm.

3. A cow's tail holder comprising a strap adapted for attaching to the cow, a tail clamping device including a rigid plate, a spring arm pivoted at one end to said plate and adapted to clamp the tail against the plate and a pivotal connector for the plate and engaging the free end of the arm to secure the arm in clamping position, said strap being attached to the connector and retaining the latter in engagement with the arm, said connector being movable laterally of the arm for releasing the arm.

LOUIS BUBENIC.